US009686196B2

(12) United States Patent
Jeng et al.

(10) Patent No.: US 9,686,196 B2
(45) Date of Patent: Jun. 20, 2017

(54) METHODS, APPARATUS, AND ARTICLES OF MANUFACTURE TO PROVIDE A MULTICAST VIRTUAL PRIVATE NETWORK (MVPN)

(71) Applicant: AT&T Intellectual Property I, L.P., Atlanta, GA (US)

(72) Inventors: Huajin Jeng, San Diego, CA (US); Pravin Kumar Johri, Aberdeen, NJ (US); Han Nguyen, Marlboro, NJ (US); Samir Saad, Ocean, NJ (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1 day.

(21) Appl. No.: 14/954,535

(22) Filed: Nov. 30, 2015

(65) Prior Publication Data

US 2016/0080264 A1     Mar. 17, 2016

Related U.S. Application Data

(63) Continuation of application No. 13/285,927, filed on Oct. 31, 2011, now Pat. No. 9,225,633.

(51) Int. Cl.
*H04L 12/28* (2006.01)
*H04L 12/741* (2013.01)
(Continued)

(52) U.S. Cl.
CPC .......... *H04L 45/745* (2013.01); *H04L 12/18* (2013.01); *H04L 43/10* (2013.01); *H04L 45/16* (2013.01); *H04L 45/50* (2013.01); *H04L 12/1836* (2013.01)

(58) Field of Classification Search
USPC ............. 370/248, 290, 252, 254, 389, 390
See application file for complete search history.

(56) References Cited

U.S. PATENT DOCUMENTS 7,099,323 B1    8/2006  Doong et al.
7,281,058 B1   10/2007  Shepherd et al.
(Continued)

FOREIGN PATENT DOCUMENTS

WO    2008016372    2/2008

OTHER PUBLICATIONS

United States Patent and Trademark Office, "Notice of Allowance," U.S. Appl. No. 13/285,927, mailed Aug. 18, 2015 (11 pages).
(Continued)

*Primary Examiner* — John Pezzlo
(74) *Attorney, Agent, or Firm* — Hanley, Flight & Zimmerman, LLC

(57) ABSTRACT

Methods, apparatus, and articles of manufacture to provide a multicast virtual private network (MVPN) are disclosed. An example method to transmit multicast data over a communication network includes: determining an upstream hop of a multicast transmission based on a received hierarchical ingress replication route; storing a downstream hop and the upstream hop of the multicast transmission in a multicast routing table; monitoring the multicast transmission occurring via an area border router; in response to detecting at least one of a) a threshold fan-out of the multicast transmission or b) a threshold data rate from a source of the multicast transmission, converting a logical topology of the multicast transmission; and in response to receiving a multicast data packet of the multicast transmission, replicating the multicast data packet with the processor based on the downstream hop.

20 Claims, 10 Drawing Sheets

(51) Int. Cl.
*H04L 12/761* (2013.01)
*H04L 12/723* (2013.01)
*H04L 12/26* (2006.01)
H04J 1/16 (2006.01)
H04L 12/18 (2006.01)

(56) References Cited

U.S. PATENT DOCUMENTS

| | | |
|---|---|---|
| 7,626,984 B2 | 12/2009 | Napierala |
| 7,855,950 B2 | 12/2010 | Zwiebel et al. |
| 7,969,908 B2 | 6/2011 | Ballantyne |
| 2003/0088696 A1 * | 5/2003 | McCanne ........... H04L 12/1836 709/238 |
| 2006/0159091 A1 | 7/2006 | Boers et al. |
| 2007/0025277 A1 | 2/2007 | Sajassi et al. |
| 2007/0147372 A1 | 6/2007 | Liu et al. |
| 2009/0201803 A1 | 8/2009 | Filsfils et al. |
| 2010/0008361 A1 | 1/2010 | Guichard et al. |
| 2010/0043067 A1 | 2/2010 | Varadhan et al. |
| 2010/0232404 A1 | 9/2010 | Chen et al. |
| 2013/0100953 A1 | 4/2013 | Li et al. |
| 2013/0107725 A1 | 5/2013 | Jeng et al. |

OTHER PUBLICATIONS

United States Patent and Trademark Office, "Non-Final Office Action," U.S. Appl. No. 13/285,927, mailed Mar. 16, 2015 (9 pages).

United States Patent and Trademark Office, "Non-Final Office Action," U.S. Appl. No. 13/285,927, mailed Jun. 24, 2014 (5 pages).

\* cited by examiner

METHODS, APPARATUS, AND ARTICLES OF MANUFACTURE TO PROVIDE A MULTICAST VIRTUAL PRIVATE NETWORK (MVPN)

FIELD OF THE DISCLOSURE

This patent arises from a continuation of U.S. patent application Ser. No. 13/285,927, filed on Oct. 31, 2011, entitled "Methods, Apparatus, and Articles of Manufacture to Provide a Multicast Virtual Private Network (MVPN)." The entirety of U.S. patent application Ser. No. 13/285,927 is incorporated herein by reference.

FIELD OF THE DISCLOSURE

This disclosure relates generally to networks and, more particularly, to systems, methods, and articles of manufacture to provide a multicast virtual private network (MVPN).

BACKGROUND

In a known service provider communication network, an edge node, such as a provider edge router (PER), interfaces customer premises equipment (CPE) with the provider network. The edge node, in turn, directly or indirectly interfaces with the network node(s) implementing the provider network. Examples of such network nodes include area border routers (ABRs) that define the interfaces between the provider's core network and the edge segments of the provider network (e.g., containing the edge nodes), core routers implementing the core network, autonomous system boundary routers (ASBRs) interfacing different provider networks, etc.

Multicasting is a feature offered by provider networks to enable sending data from a single customer data source communicatively coupled to an edge node (referred to as a root edge node or root node) to be conveyed via the network node(s) implementing the provider network to multiple customer data receivers communicatively coupled to one or more other edge nodes (referred to as leaf edge nodes or leaf nodes). Prior techniques to perform multicasting generally involve the root edge node replicating copies of the multicast data for each leaf edge node, and/or the network node(s) maintaining state information for a multicast tree used to route the multicast data through the provider network from the root edge node to the various leaf edge node(s).

DETAILED DESCRIPTION

Figure 1:
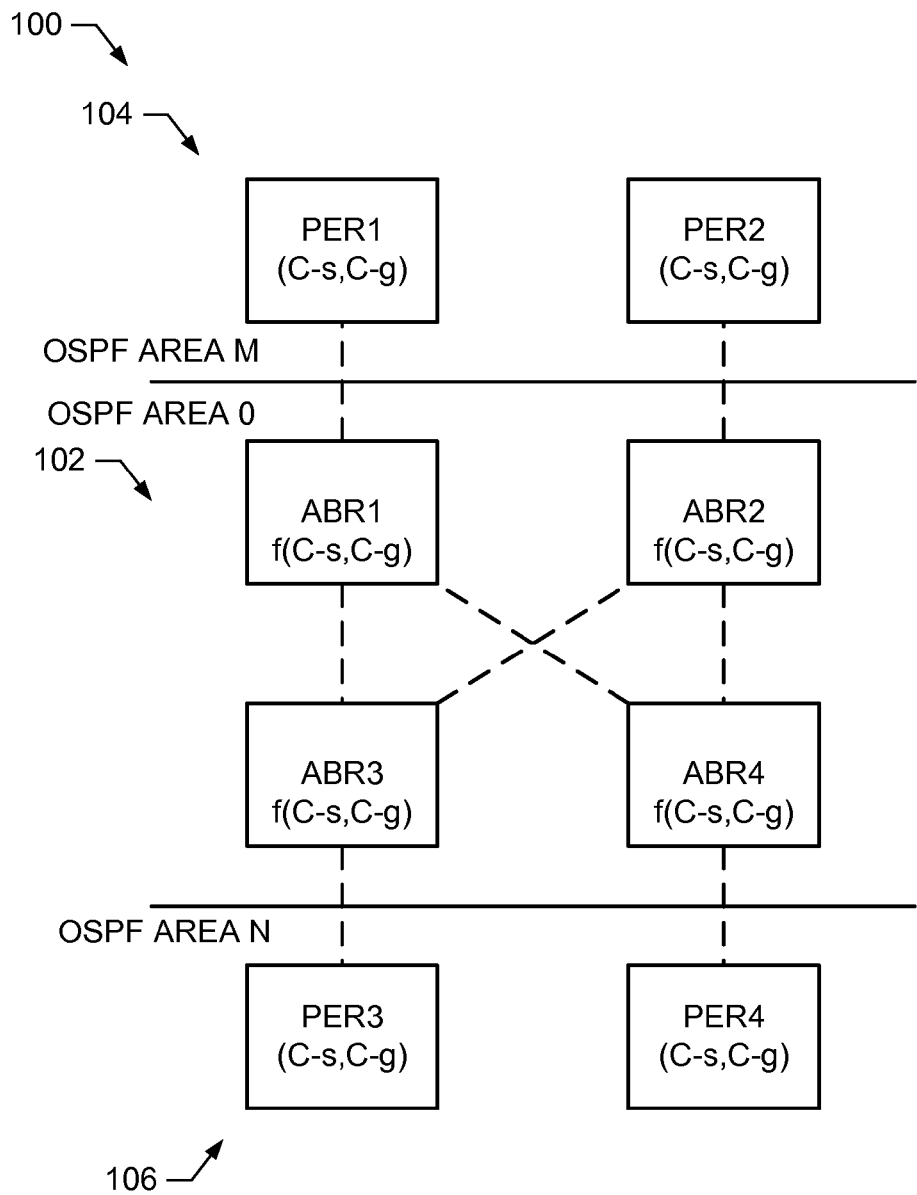
FIG. 1 is a block diagram of a known network to send multicast data.

To support multicast virtual private network (MVPN), multicast protocols, such as protocol independent multicasting (PIM) and/or point-to-multipoint MPLS based protocol, are employed in the core and edge networks. Using multicast protocols that build multicast trees in the core and edge networks provides better bandwidth efficiency at the expense of backbone routers (BRs) control plane resources. The multicast tree uses a separate data plane than the data plane used by unicast multiprotocol label switching (MPLS) infrastructure. As a result, customers may experience inferior quality with multicast than with unicast. However, based on the past 2 to 3 years of MVPN data analysis, the inventors of this patent found that a majority of applications are (1) low-data rate, (2) small fan-out (e.g., few and/or concentrated receiver nodes), or (3) both low-data rate and small-fan-out. Some bursty multicast applications only send few periodic packets, but generate a significant amount of churn in both provider edge routers (PERs) and BRs by building and tearing down short-lived multicast trees. Known methods of multicasting are also prone to MVPN PIM adjacency flapping which requires time and resources for troubleshooting. With known multicast technologies, BRs are likely to exhaust their control plane resources to maintain large numbers of multicast states and are at risk of instability due to the dynamic nature of building and tearing down multicast trees. In addition, separate multicast specific network management tools are required to support multicast based technology. The potential instability can make critical multicast applications unusable and/or unreliable. Reliability is important in many applications. For example, the Federal Aviation Administration uses multicast to communicate air-plane positions to air plane control towers around the United States.

To overcome the above-noted deficiencies of the prior art, example methods, apparatus, and/or articles of manufacture disclosed herein provide a non-congruent design to implement MVPNs using Border Gateway Protocol (BGP) capabilities to overlay the MVPN service over a unicast MPLS infrastructure. Example methods, apparatus, and/or articles of manufacture disclosed herein are scalable to handle increasing numbers of multicast flows. In some such examples, scalability is achieved by removing multicast state management from the BRs and/or providing separate unicast and multicast control plane management at the BRs. In some examples, the BRs are Area Border Routers (ABRs) in an Open Switched Path First (OSPF) zero area. In some example methods, apparatus, and/or articles of manufacture disclosed herein, the ABRs in the OSPF zero area are provided with multicast service processors (MSPs) to provide and manage the multicast control plane and data plane services separate from the ABRs. Some example MSPs also provide a Rendezvous Point (RP) to implement legacy MVPN services such as the known MVPN methods described above. Example methods, apparatus, and/or articles of manufacture disclosed herein trade-off a modest amount of bandwidth efficiency to achieve control plane resource efficiency and simplicity in supporting MVPN applications. The efficiency and simplicity gained by these examples provides the ability to scale multicast and unicast services while providing substantially equivalent customer experience quality for both multicast and unicast services.

A disclosed example method includes sending a multicast receiver route received from one of a multicast service processor or a provider edge router to another of the multicast service processor or the provider edge router, and replicating multicast data received from the other of the multicast service processor or the provider edge router to the one of the provider edge router or the multicast service processor based on the multicast receiver route.

A disclosed example multicast service processor includes a control plane controller to receive a first multicast receiver route, to store the first multicast receiver route in a multicast routing table, and to send to one of a second multicast service processor or a provider edge router a second multicast receiver route based on the first multicast receiver route, and a data plane controller to replicate first multicast data received from the second multicast service processor or the provider edge router based on the first multicast receiver route.

A disclosed example article of manufacture comprises machine readable instructions which, when executed, cause a processor to at least send a first multicast receiver route received from a first one of a multicast service processor or a provider edge router to a second one of the multicast service processor or the provider edge router, and to replicate multicast data received from the second one of the multicast service processor or the provider edge router to the first one of the provider edge router or the multicast service processor based on the first multicast receiver route.

FIG. 1 is a block diagram of a known network 100 to send multicast data. The example network 100 of FIG. 1 implements a two-level OSPF hierarchy. A first or backbone OSPF level of the communication system 100 is referred to herein as "OSPF zero area" (or "area 0") 102. Additional OSPF areas (e.g., OSPF area M 104 and OSPF area N) at a second or lower level of the communication system 100 are referred to herein as "OSPF non-zero areas" and are communicatively coupled to each other via the example OSPF zero area 102.

Each of the OSPF non-zero areas 104, 106 of the network of FIG. 1 includes one or more PERs. As used herein, a PER is a router implemented at the edge of a service provider's network that is communicatively coupled, via one or more communication paths but without any intervening router, to a customer edge router (CER) implemented at the edge of a customer's network. More than one CER may be communicatively coupled to any of the PERs (e.g., PER1 and PER2). One or more area border routers (ABRs) couple corresponding ones of the OSPF non-zero areas 104, 106 to the OSPF zero area 102. Each of the PERs (e.g., PER1 and PER2) is communicatively coupled to one or more ABRs. As used herein, the term ABR refers to a router configured to communicatively couple an OSPF zero area to at least one OSPF non-zero area. Thus, as shown in FIG. 1, ABRs, which have multiple interfaces and participate in and/or are configured to operate in multiple areas, communicatively couple the OSPF non-zero areas 104, 106 to the OSPF zero area 102. Of the ABRs (e.g., ABR1-ABR4) depicted in FIG. 1, ABR1 and ABR2 communicatively couple the OSPF non-zero area M 104 (i.e., PER1 and PER2) to the OSPF zero area 102, and ABR3 and ABR4 communicatively couple the OSPF non-zero area N 106 to the OSPF zero area 102.

The known network 100 of FIG. 1 provides MVPN services to customers connected to the network 100 according to one or more of the following draft protocols: "RFC 6037 Cisco Systems' Solution for Multicast in BGP/MPLS IP VPNs," October 2010; "Internet Engineering Task Force (IETF) Internet Draft for Multicast in MPLS/BGP IP VPNs," Jan. 28, 2010, (draft-ietf-13vpn-2547bis-mcast-10.txt); and/or "Internet Engineering Task Force (IETF) Internet Draft for BGP Encodings and Procedures for Multicast in MPLS/BGP IP VPNs," Oct. 1, 2009, (draft-ietf-13vpn-2547bis-mcast-bgp-08.txt). The MVPN services provided by these draft protocols and the network 100 create multicast routing and forwarding states, which are a function of (Customer-source, Customer-group) states (e.g., (C-s, C-g) states, Forwarding Equivalent Classes associated with (C-s, C-g) states) in the ABRs (ABR1-ABR4). The multicast states significantly burden the control plane resources of the ABRs (ABR1-ABR4). Further, the multicast states are constantly present even when customers are not running multicast because the states are used to instantiate a MVPN among PERs (e.g., implementation based on RFC 6037 noted above). As a result, the network 100 of FIG. 1 provides different customer experiences for multicast traffic than for unicast traffic. For instance, unicast traffic enjoys millisecond restoration (after connectivity failure) performed by the ABRs (e.g., ABR1-ABR4), while multicast traffic has substantially longer restoration times. While multicast is designed to be bandwidth-efficient, the MVPN services provided by the network 100 may be bandwidth inefficient for Session Description Protocol (IETF RFC 4566, July 2006)-like (SD-like) multicast applications. For instance, on average, sending one SD-like data packet requires the network 100 to process 80 multicast control packets, causing significant bandwidth and/or control plane inefficiency. Due to these limitations, the network 100 of FIG. 1 has limited scalability for providing MVPN services to customers and may cause different and/or undesirable customer experience quality for multicast applications than for unicast applications.

Figure 2:
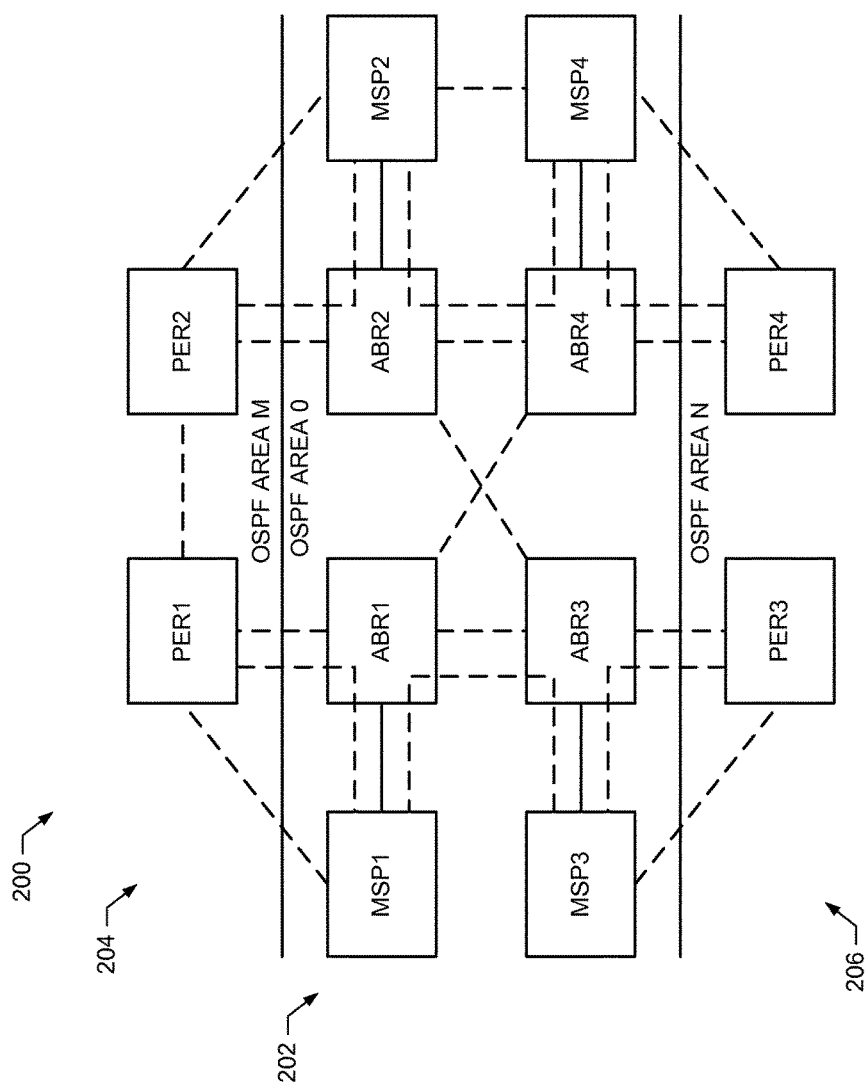
FIG. 2 is a block diagram of an example network constructed in accordance with the teachings of this disclosure and including multicast service processors to send multicast data.

FIG. 2 is a block diagram of an example network 200 constructed in accordance with the teachings of this disclosure to send multicast data including multicast service processors (MSPs) (e.g., MSP1-MSP4). The example network 200 of FIG. 2 overcomes the foregoing deficiencies of the known network of FIG. 1 in providing MVPNs by separating the control planes for multicast and unicast services. In the example of FIG. 2, the MSPs (e.g., MSP1-MSP4) are coupled to respective ones of the ABRs (e.g., ABR1-ABR4). In contrast to the ABRs in the network 100 of FIG. 1, the example ABRs (e.g., ABR1-ABR4) of FIG. 2 do not manage multicast states and, instead, handle only unicast states. The example MSPs (e.g., MSP1-MSP4) of FIG. 2 manage the multicast states and the propagation of multicast data from sources of the multicast data to the receivers of the multicast data.

The example network 200 of FIG. 2 is a scalable MPLS-based communication system. The scalable MPLS-based communication system is implemented using a hierarchical OSPF architecture as defined or described in any past, present and/or future standard and/or recommendation such as IETF RFC 2328 for OSPF Version 2, April 1998, which is hereby incorporated by reference in its entirety. The example network 200 uses link-state advertisements (LSA) to distribute routing information and/or route selection criteria as defined or described in any past, present and/or future OSPF standard and/or recommendation such as IETF RFC 2328. However, other protocol(s) may be used to distribute and/or determine link state and link cost information. Example information that may be included in an OSPF LSA include, for example, attached interface identifiers and route selection metrics.

The example network 200 of FIG. 2 includes an OSPF zero area 202 similar to the OSPF zero area 102. Additionally, the example network 200 of FIG. 2 includes two OSPF non-zero areas M and N 204, 206, which are similar to respective ones of the OSPF non-zero areas M and N 104, 106 of FIG. 1. The example OSPF non-zero areas of FIG. 2 are configured at the same level of hierarchy of the OSPF routing protocol. While the example network 200 of FIG. 2 includes one OSPF zero area 202, and two OSPF non-zero areas 204, 206, other example communication systems may include any number of OSPF non-zero areas at the same or different levels, and/or more than one OSPF zero area. Each of the example OSPF areas 202, 204, 206 of FIG. 2 implements a respective network having any number and/or type(s) of routers connected via any number and/or type(s) of communication path(s), protocols, and/or topology(ies). Additionally, while the example OSPF zero area 202 is depicted as having four ABRs (e.g., ABR1-ABR4) and a corresponding four MSPs (e.g., MSP1-MSP4), the OSPF zero area 202 may have any number of ABRs and MSPs. While the PERs (e.g., PER1-PER4) are depicted in the example of FIG. 2 as coupled to the ABRs (e.g., ABR1-ABR4) and the MSPs (e.g., MSP1-MSP4), they may be communicatively coupled via any number and/or type(s) of intervening or intermediate router(s) and/or link(s). Further, an ABR may be configured in more than one non-zero OSPF area.

The example MSPs (e.g., MSP1-MSP4) and PERs (e.g., PER1-PER6) of FIG. 2 collectively implement a non-congruent topology to decouple multicast control plane from the ABRs. As used herein, a non-congruent topology refers to a multicast control plane topology that is non-congruent with a unicast control plane topology. Non-congruent, as used in this context, means having different logical topologies (e.g., different IP addresses used for the ABRs and MSPs, even if the MSP is physically implemented within or adjacent to the ABR). In the example of FIG. 2, unicast and congruent multicast transmissions communicate via respective ABRs (e.g., using the IP addresses of the ABRs) while non-congruent multicast transmission will communicate via the MSPs (e.g., using the IP addresses of the MSPs). For example, in the example of FIG. 2, the unicast control plane topology is different than and substantially logically agnostic to the existence of the MSPs (e.g., MSP1-MSP4), while the multicast control plane topology is different than and substantially logically agnostic to the existence of the ABRs (e.g., ABR1-ABR4). However, the example MSPs (e.g., MSP1-MSP4) of the illustrated example bridge the non-congruent topologies to provide multicast services via the unicast data and control planes.

The example MSPs (e.g., MSP1-MSP4) of FIG. 2 may be implemented as servers that are separate and/or adjunct to the respective ABRs (e.g., ABR1-ABR4), as separate hardware contained within the same physical enclosure as the ABRs (e.g., ABR1-ABR4) (e.g., a line card, a separate routing engine, etc.), as ingress PERs acting as adjunct servers for the ABRs (e.g., ABR1-ABR4), and/or any combination thereof. As used herein, ingress, as applied to a PER, an ABR, and/or an MSP, refers to the server at which unicast and/or multicast data enters the network 200 from a source of the data (e.g., a unicast and/or multicast source at a customer point of service). The term egress, as applied to a PER, an ABR, and/or an MSP herein, refers to the server at which unicast and/or multicast data exits the network to a destination or receiver of the data (e.g., a unicast and/or multicast receiver at another customer point of service).

The example PERs of FIG. 2 are logically partitioned into different subsets and associated to respective ones of the MSPs (e.g., MSP1-MSP4). In particular, the MSPs (e.g., MSP1-MSP4) act as the next-hop of the PERs (e.g., PER1-PER4) for multicast data, in a manner similar to the ABRs (e.g., ABR1-ABR4) being the next-hops of the PERs (e.g., PER1-PER4) for unicast data. Example MPLS-based networks, PERs, and/or ABRs that may be used to implement the example network 200, PERs (e.g., PER1-PER4), and/or ABRs (e.g., ABR1-ABR4) of FIG. 2 are disclosed in U.S. patent application Ser. No. 12/885,168, filed on Sep. 17, 2010. To achieve this partitioning, the example PERs and MSPs of the illustrated example transmit multicast data using point-to-point label-switched paths (P2P LSP). In the example P2P LSP, an ingress router applies a label to a data packet entering the network based on a forwarding equivalence class. Intermediate routers exchange the label on the packet with another labels based on the next destination on the path from the ingress router to an egress router, and the egress router removes the label from the data packet and forwards the packet based on another layer, such as an Internet protocol address (e.g., IPv4, IPv6). The MSPs and the PERs of the illustrated example have a label binding and the MSPs have label bindings with each other, which creates P2P LSPs having multiple segments (e.g., independent sections of a path): (1) from an ingress PER to an ingress MSP, (2) from an ingress MSP to an egress MSP, and (3) From an egress MSP to an egress PE. Accordingly, the example MSPs (e.g., MSP1-MSP4) perform LSP stitching. As used herein, LSP stitching is defined as a mechanism where an end-to-end MPLS LSP can use an intermediate LSP to provide a segment of the path.

The example MSPs (e.g., MSP1-MSP4) and PERs (e.g., PER1-PER4) of FIG. 2 manage multicast data on both the control plane and the data plane. In some examples, the ABRs and PERs implement known methods of multicast data transmission (e.g., the MSP is not used) until the multicast data transmission meets one or more conditions, at which time the ingress PER initiates a transition to a non-congruent topology. As a result of the transition, MSPs and PERs switch the multicast data transmission to the non-congruent topology. Example conditions triggering the switch to the non-congruent topology include: 1) meeting or exceeding a data rate from the source, 2) meeting or exceeding a fan-out (e.g., number of branches, number of receiver nodes of the multicast data, and/or 3) a combination of 1) and 2). In some other examples, the MSPs and PERs use the non-congruent topology for all multicast data transmissions.

On the control plane, when the PERs determine that the non-congruent topology is to be used for a multicast data transmission, the source (ingress) PER (e.g., PER1) triggers a BGP auto-discovery (A-D) route to all PERs in the MVPN (e.g., PER2, PER3, PER4, etc.). An example A-D route contains a MVPN customer multicast route (e.g., (C-s, C-g)) and has two attributes: a tag to request the receiver of the A-D route for a response, and a community identifier specifying either ingress replication (IR) or hierarchical ingress replication (HIR). HIR is disclosed in U.S. patent application Ser. No. 12/963,338, filed Dec. 8, 2010, the entirety of which is hereby incorporated by reference. Upon receiving the A-D route, each egress PER having receivers of the multicast data transmission coupled to the network 200 via the egress PER (e.g., PER3 and PER4) responds by sending a leaf A-D route and a label directly to a respective upstream hop (e.g., an ingress PER). If the community identifier is IR, the label specifies the MVPN multicast (e.g., (C-s, C-g)) in the egress PER. If the community identifier is HIR, the example egress PER (e.g., PER3, PER4) responds with a HIR leaf A-D route to the upstream next hop (e.g., the egress MSPs, MSP3, MSP4). The HIR leaf A-D route propagates to the ingress PER (e.g., PER1) via the ingress MSP (e.g., MSP1). The example HIR leaf A-D route includes a label that specifies the multicast routes in the egress PER (e.g., PER3, PER4). Upon receiving the HIR leaf A-D routes, the egress MSPs (e.g., MSP3, MSP4) respond by sending respective HIR leaf A-D routes to the ingress MSP (e.g., MSP1), which is the upstream next hop to the ingress PER (e.g., PER1), with labels specifying the multicast routes in the egress MSPs (e.g., MSP3, MSP4). The example ingress MSP (e.g., MSP1) receives the HIR leaf A-D routes and responds with leaf A-D routes to the ingress PER (e.g., PER1), including a label that specifies the multicast route in the ingress MSP (e.g., MSP1).

When receiving a HIR leaf A-D route, the receiving MSP (e.g., MSP1-MSP4) updates a multicast group to associate the HIR leaf A-D route with the multicast group. For example, each of the MSPs (e.g., MSP1-MSP4) maintains a multicast state table, which includes the source of the multicast data transmission (e.g., a source address), the receivers or group members of the multicast data transmission (e.g., a group address, receiver addresses, etc.), and/or the next-hop addresses and/or labels associated with the multicast data transmission. In some examples, the MSPs (e.g., MSP1-MSP4) operate the control plane (e.g., to add and/or drop receivers during the multicast data transmission) while multicast data is being transmitted on the data plane.

When the source PER (e.g., PER1) receives leaf IR A-D routes from egress PERs (e.g., PER2), the source PER (e.g., PER1) replicates multicast data to the egress PER (e.g., PER2). In contrast, when the source PER (e.g., PER1) receives HIR leaf A-D routes from the ingress MSPs (e.g., MSP1) and the MSPs and PERs are operating in the example non-congruent topology, the source PER (e.g., PER1) replicates multicast packets to the ingress MSPs (e.g., MSP1). The source PER (e.g., PER1) forwards the multicast packets similarly to unicast packets, including an inner label received from either an egress PER (e.g., PER3, PER4) or the ingress MSP (e.g., MSP1), and an outer label (e.g., a Label Distribution Protocol (LDP) label) for the egress PER (e.g., PER2) or the ingress MSP (e.g., MSP1). When the ingress MSP (e.g., MSP1) receives the multicast data, it replicates the data to the egress MSPs (e.g., MSP3, MSP4). The ingress MSP (e.g., MSP1) replicates the multicast data, with an inner label received from the egress MSP (e.g., MSP3, MSP4) (e.g., in the leaf A-D route) and an outer label (e.g., a LDP label), for the egress MSP (e.g., MSP3, MSP4). The multicast packets are forwarded through the core network using MPLS label switching as used in unicast data forwarding. If the core network (e.g., the OSPF zero area 202) is running Fast Re-Route (FRR) or traffic engineering (TE), an outer label is added by the ABRs (e.g., ABR1-ABR4) and/or swapped as the packet travels through the OSPF zero area 202. Thus, the multicast packets are protected in the same way as unicast packets. When an egress MSP (e.g., MSP3) receives multicast data, the egress MSP (e.g., MSP3) replicates the data to one or more egress PERs (e.g., PER3). The MSP (e.g., MSP3) forwards the multicast packets, with an inner label received from an egress PER (e.g., PER3) and an outer label (i.e., the LDP label), for the egress PER (e.g., PER3).

The example network 200 of FIG. 2 decouples the data plane technology in the OSPF zero area 202 and each non-zero area 204, 206. The MSPs can serve as RPs and/or PIM surrogates for existing PIM-based MVPN applications. On the control plane, the MSPs redistribute PIM control messages into BGP messages to other MSPs. On the data plane, the MSPs use IR to forward multicast data received from the legacy PERs to remote MSPs in the OSPF zero area 202. In the example network 200 of FIG. 2, the ABRs (e.g., ABR1-ABR4) do not need to support large numbers of multicast states created by either PIM or P2MP MPLS based protocols, and/or do not need to support control planes required for HIR.

Figure 3:
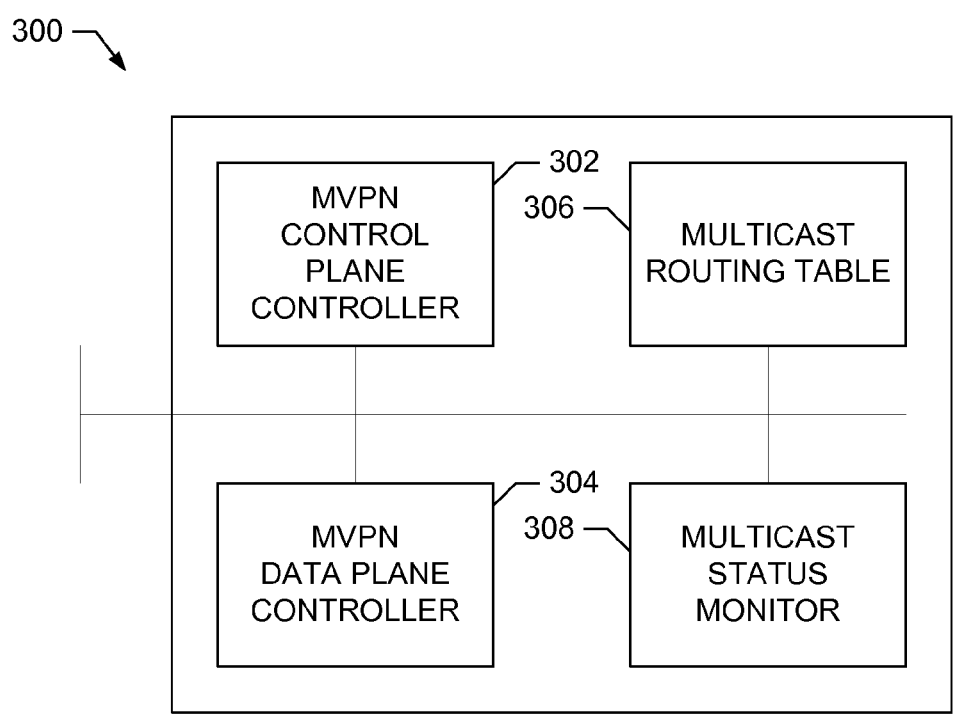
FIG. 3 is a block diagram of an example implementation of a multicast service processor of FIG. 2.

FIG. 3 is a block diagram of an example MSP 300. The example MSP 300 may be used to implement any or all of the example MSPs (e.g., MSP1-MSP4) of FIG. 2 to provide a non-congruent topology for providing MVPN in an MPLS network. The example MSP 300 of FIG. 3 includes an MVPN control plane controller 302, an MVPN data plane controller 304, a multicast routing table 306, and a multicast status monitor 308.

The example MVPN control plane controller 302 of FIG. 3 controls and manages the control plane for providing MVPN via a network. The MVPN control plane controller 302 of the illustrated example identifies customer multicast routes, stores the routes, and updates other MSPs in the network with the customer multicast routes.

When the example MVPN control plane controller 302 of FIG. 3 receives a HIR leaf A-D route, the MVPN control plane controller 302 determines the upstream hop of the multicast transmission (e.g., the MSP or PER that will provide the multicast data to the MVPN control plane controller 302) based on the router from which the HIR leaf A-D route is received. The MVPN control plane controller 302 also determines the downstream hop (e.g., the MSP or PER to which the multicast data will be replicated) based on a label contained in the HIR leaf A-D route. The example MVPN control plane controller 302 stores both the upstream hop and the downstream hop of the multicast flow in the multicast routing table 306 (e.g., in association with the multicast data transmission, the multicast group, etc.). If one or more downstream hops are already stored in the multicast routing table for the multicast data transmission (e.g., the multicast group), the example MVPN control plane controller 302 adds the downstream hop to the multicast data transmission, while the upstream hop does not change.

The example MVPN data plane controller 304 of FIG. 3 controls and manages the data plane for providing MVPN via the network. The example MVPN data plane controller 304 of the illustrated example receives multicast data packets from an upstream router (e.g., a MSP, a PER), determines the label(s) to be applied to the multicast data packets, and replicates the multicast data packets with the label(s) to one or more downstream routers (e.g., a MSP, a PER).

Upon receiving a multicast data packet on the data plane, the example MVPN data plane controller 304 determines the multicast group based on the label(s) in the multicast data packet. The MVPN data plane controller 304 accesses the multicast routing table 306 to determine the downstream hop(s) to which the multicast data packet is to be replicated. If two or more receivers in the group have the same downstream hop from the MSP 300, the example MVPN data plane controller 304 replicates only one copy of the multicast data packet to the downstream hop.

The example multicast routing table 306 of FIG. 3 stores multicast routes (e.g., determined by the MVPN control plane controller 302) and provides stored multicast routes (e.g., requested by the MVPN data plane controller 304). As mentioned above, the multicast receiver routes stored in the multicast routing table 306 may include a source identifier, a group identifier, an upstream hop, a downstream hop, and/or any additional information for the receiver of the example multicast data stream.

The example multicast status monitor 308 of FIG. 3 monitors the status of the multicast data transmissions occurring in the network. In some examples, the multicast status monitor 308 monitors a multicast transmission to determine the fan-out (e.g., the number of receivers of the multicast transmission) and to determine the data rate (e.g., the amount of data being sent per unit of time by the multicast data source). In the example of FIG. 3, if either the fan-out, the data rate, or a product or other combination of the fan-out and the data rate exceeds a corresponding threshold, the multicast status monitor 308 receives a signal (e.g., from an ingress PER) via the MVPN control plane controller 302 to change the multicast transmission from a congruent topology such as that described in connection with FIG. 1 to the non-congruent topology. In some examples, the multicast status monitor 308 may determine that the multicast transmission is to change to the non-congruent topology in response to receiving an auto-discovery route from a downstream node (e.g., an egress MSP, an egress PER), which may occur in response to the ingress PER determining that the multicast transmission is to change to the non-congruent topology. In this manner, the multicast status monitor 308 enables use of the higher bandwidth efficiency of the congruent topology until the fan-out and/or the data rate of a multicast transmission merits a sacrifice in bandwidth efficiency for improved control plane resource usage.

Figure 4A:
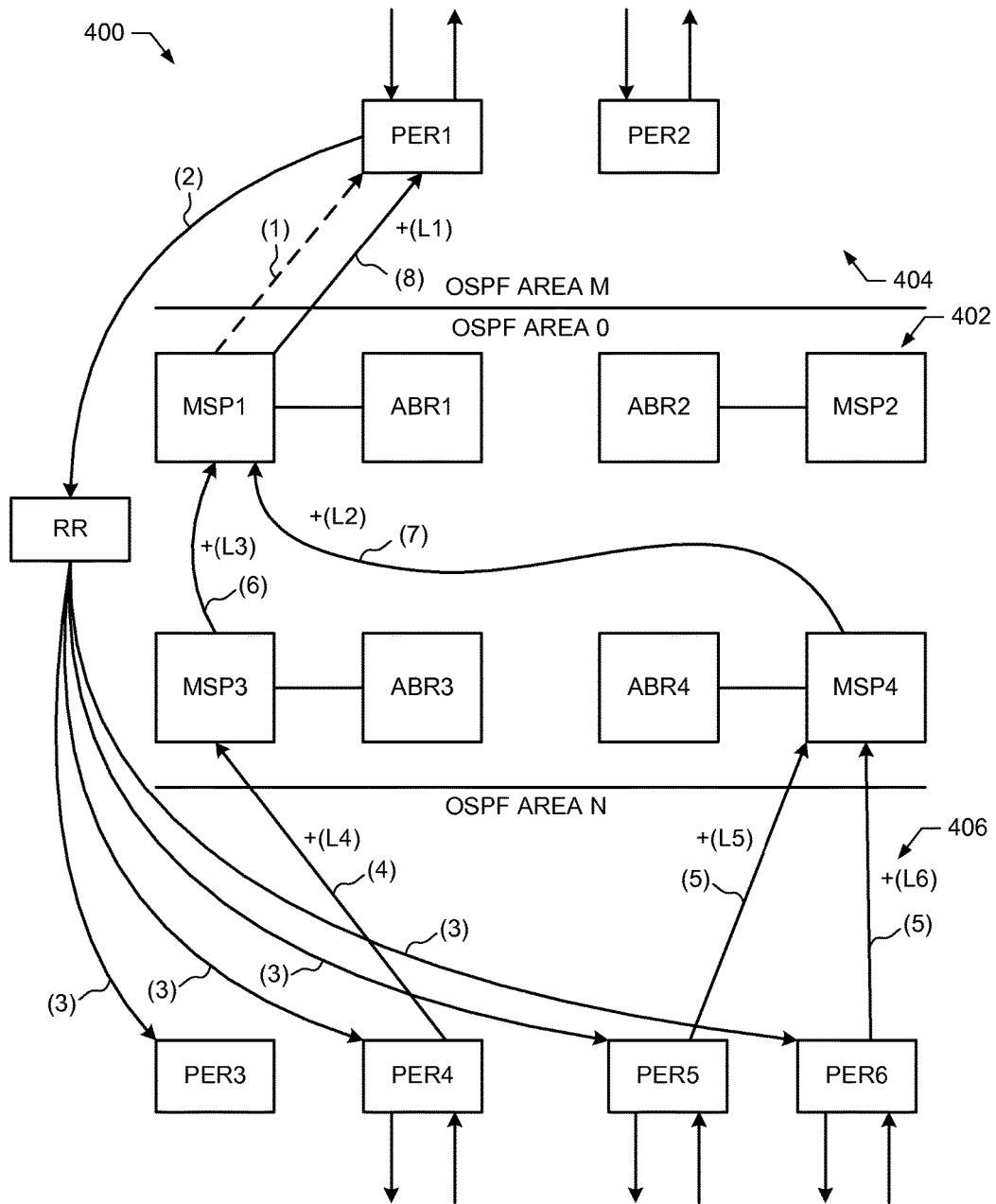
FIGS. 4A and 4B illustrate an example network such as the network of FIG. 2 during an example method to initialize a multicast path for a multicast transmission and transmit multicast data.
Figure 4B:
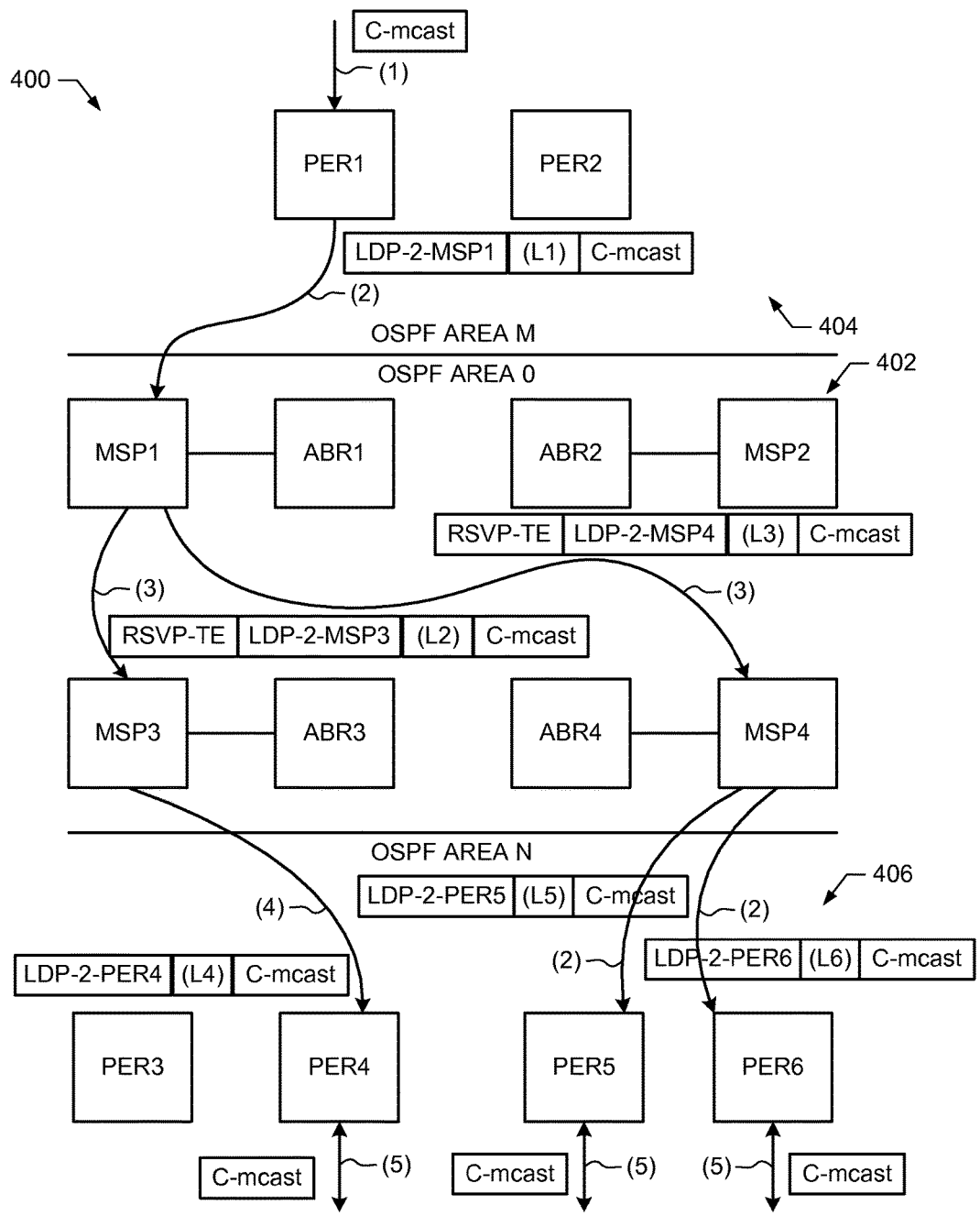

FIGS. 4A and 4B illustrate a network 400 during an example method to initialize a multicast path for a multicast transmission. The method illustrated in FIGS. 4A and 4B may occur at the initialization of a multicast data transmission or at the occurrence of an event (e.g., the fan-out and/or the data rate of an existing multicast data transmission exceeds a corresponding threshold).

FIG. 4A illustrates the example network 400, including a plurality of control plane communications. As illustrated in FIG. 4A, the example network 400 includes an OSPF zero area 402 and two OSPF non-zero areas 404, 406. In the OSPF zero area 402, the example network 400 includes ABRs (e.g., ABR1-ABR4) and MSPs (e.g., MSP1-MSP4) in communication with the corresponding ABRs. The example network 400 of FIG. 4 also includes a route reflector RR. In the example of FIG. 4A, the route reflector RR acts as a centralized peering server for the PERs (e.g., PER1-PER6). For the illustrated multicast data transmission, the source of the multicast data connects to the network 400 via a first PER (e.g., PER1), while receivers of the multicast data connect to the network 400 via other respective PERs (e.g., PER4, PER5, and PER6).

The example OSPF non-zero area M 404 includes two PERs (e.g., PER1, PER2), which connect customers to the network 400. The first PER (e.g., PER1) is communicatively coupled to the ABR1 and MSP1 and the second PER (e.g., PER2) is communicatively coupled to the ABR2 and MSP2 for the purposes of the non-congruent multicast topology. The example OSPF non-zero area N 406 includes four PERs (e.g., PER3, PER4, PER5, PER6). Two of the PERs (e.g., PER3, PER4) are communicatively coupled to the ABR3 and MSP3 and the other two PERs (e.g., PER5, PER6) are communicatively coupled to the ABR4 and MSP4 for the purposes of the non-congruent multicast topology.

When the ingress PER (e.g., PER1) determines that the multicast data transmission is to use a non-congruent topology, the PER1 signals (1) the egress PERs (e.g., PER3, PER4) to initialize the non-congruent topology. The PER1 advertises (2) a BGP auto-discovery (A-D) route with a leaf flag and a segmented LSP community for HIR to the route reflector RR. The route reflector RR reflects (3) the A-D route to the PERs (e.g., PER3-PER6).

In the example of FIG. 4A, when the PER3 receives the HIR A-D route from the RR, the PER3 does not respond because no receivers are connected to the network 400 via the PER3. In contrast, in the example of FIG. 4A the PER4 determines that the egress MSP (e.g., MSP3) is the upstream next hop to reach the ingress PER (e.g., PER1). PER4 responds to the HIR A-D route by sending (4) a leaf route to the MSP3, the leaf route including a label (L4) identifying the PER4. Similarly, the PER5 and PER6 determine that the egress MSP (e.g., MSP4) is the upstream next hop to reach the ingress PER (e.g., PER1). PER5 and PER6 respond to the HIR A-D routes by sending (5) HIR leaf A-D routes to the MSP4. The PER5 includes a label (L5) identifying MVPN multicast route in the PER5, and the PER6 includes a label (L6) identifying MVPN multicast route in the PER6.

The example MSP3 of FIG. 4 receives the HIR leaf A-D route from the PER4, determines that the ingress MSP (e.g., MSP1) is the upstream next hop to reach the ingress (e.g., PER1), attaches a label (L3) to the HIR leaf A-D route and sends (6) the updated HIR leaf A-D route to the MSP1. The MSP4 receives the HIR leaf A-D routes from the PER5 and the PER6. The MSP4 determines that the MSP1 is the upstream next hop to reach the PER1, attaches a label (L2) to the HIR leaf A-D route, and sends (7) the updated HIR leaf A-D route to the MSP1. The example label L2 identifies the MVPN route in the MSP4. The example MSP1 receives the respective HIR leaf A-D routes from the MSP3 and MSP4, attaches a label (L1), and sends (8) the HIR leaf A-D routes to the PER1. The example label L1 identifies the MVPN multicast route in the MSP1. When the PER1 receives the HIR leaf A-D routes from the MSP1, the PER1 ceases to replicate multicast data directly to the PERs (e.g., PER4-PER6) (if the PER1 was previously providing multicast data to the PERs via a congruent topology) and begins replicating multicast data to the MSP1.

FIG. 4B illustrates the example network 400 of FIG. 4A and a number of data plane communications to provide multicast data from a source to a number of receivers. The example data plane communications illustrated in FIG. 4B occur during and/or after the example control plane communications of FIG. 4A. In the example of FIG. 4B, the source of a multicast data transmission sends (1) an example multicast data packet to the ingress PER (e.g., PER1). The multicast data packet includes the customer multicast (C-mcast) data.

The example ingress PER (e.g., PER1) of FIG. 4B receives and replicates (2) the received multicast data. In replicating the multicast data via a non-congruent topology, the example ingress PER (e.g., PER1) adds an inner label (L1) corresponding to the label received from the MSP1 in the HIR leaf A-D route of FIG. 4A. The transmission of the multicast data from the ingress PER (e.g., PER1) to the MSP1 (e.g., from the ingress OSPF non-zero area 404 to the OSPF zero area 402) is a unicast transmission to implement a first segment of a segmented LSP, and includes an LDP label to facilitate transmission to the MSP1.

The example ingress MSP (e.g., MSP1) receives the unicast transmission from the ingress PER (e.g., PER1). The example ingress MSP (e.g., MSP1) determines the paths to be used to transmit the multicast data to the receivers (e.g., via the multicast state table 306 of FIG. 3). In the example of FIG. 4B, the ingress MSP (e.g., MSP1) is to replicate the data to the egress MSPs (e.g., MSP3, MSP4) via the OSPF zero area 402 (e.g., the core network). The ingress MSP (e.g., MSP1) generates a first unicast LSP packet to the egress MSP (e.g., MSP3), and includes the appropriate label (L2) corresponding to the label in the HIR leaf A-D route received from the egress MSP (e.g., MSP3). Similarly, the ingress MSP (e.g., MSP1) generates a second unicast LSP packet to the egress MSP (e.g., MSP4), and includes the appropriate label (L3) corresponding to the label in the HIR leaf A-D route received from the egress MSP (e.g., MSP4). In the example of FIG. 4B, the ingress MSP (e.g., MSP1) further adds respective LDP labels and Resource Reservation Protocol-Traffic Engineering (RSVP-TE) labels to facilitate transmission to the egress MSPs (e.g., MSP3, MSP4) and/or for rapid restoration of lost data packets. The ingress MSP (e.g., MSP1) sends (e.g., replicates) (3) the multicast data packets as unicast packets to the respective ones of the egress MSPs (e.g., MSP3, MSP4).

The example egress MSP (e.g., MSP3) receives the unicast transmission from the ingress MSP (e.g., MSP1). The example egress MSP (e.g., MSP3) determines the paths to be used to transmit the multicast data to the receivers (e.g., via a multicast state table). Based on the determined receivers and/or paths, the egress MSP (e.g., MSP3) generates a unicast LSP packet to be sent to the egress PER (e.g., PER4). The generated packet includes the C-mcast data, an inner label (L4) based on the HIR leaf A-D route the egress MSP (e.g., MSP3) received from the egress PER (e.g., PER4), and an LDP label to reach the PER4. The egress MSP (e.g., MSP3) sends (4) the multicast data packet as a unicast packet to the egress PER (e.g., PER4). The egress PER (e.g., PER4) removes the labels and forwards (5) the multicast data in the data packet to one or more receivers of the multicast data transmission.

The example egress MSP (e.g., MSP4) receives the unicast transmission from the ingress MSP (e.g., MSP1). The example egress MSP (e.g., MSP4) determines the paths to be used to transmit the multicast data to the receivers (e.g., via a multicast state table). In the example of FIG. 4B, receivers of the multicast data access the network through the egress PERs (e.g., PER5, PER6), which are communicatively coupled to the egress MSP (e.g., MSP4). Based on the determined receivers and/or paths, the egress MSP (e.g., MSP4) generates unicast LSP packets to be sent to the egress PERs (e.g., PER5, PER6). A first generated packet to be sent to the egress PER (e.g., PER5) includes the C-mcast data, an inner label (L5) based on the HIR leaf A-D route the egress MSP (e.g., MSP4) received from the egress PER (e.g., PER5), and an LDP label to reach the egress PER5. A second generated packet to be sent to the egress PER (e.g., PER6) includes the C-mcast data, an inner label (L6) based on the HIR leaf A-D route the egress MSP (e.g., MSP4) received from the egress PER (e.g., PER6), and an LDP label. The egress MSP (e.g., MSP4) sends (e.g., replicates) (6) the multicast data packets as unicast packets to the respective egress PERs (e.g., PER5, PER6). The PERs (e.g., PER5, PER6) each remove the respective labels and forward (7) the multicast data in the data packets to one or more receivers of the multicast data transmission.

The example data plane communications illustrated in FIG. 4B may provide different multicast data from the ingress PER (e.g., PER1) to the egress PERs (e.g., PER4-PER6) directly. Additionally, the data plane communications may be altered based on additional control plane communications, which may add and/or drop sources and/or receivers of multicast data.

While an example manner of implementing the MSP 300 has been illustrated in FIG. 3, one or more of the elements, processes and/or devices illustrated in FIG. 3 may be combined, divided, re-arranged, omitted, eliminated and/or implemented in any other way. Further, the example MVPN control plane controller 302, the example MVPN data plane controller 304, the example multicast routing table 306, the example multicast status monitor 308 and/or, more generally, the example MSP 300 of FIG. 3 may be implemented by hardware, software, firmware and/or any combination of hardware, software and/or firmware. Thus, for example, any of MVPN control plane controller 302, the example MVPN data plane controller 304, the example multicast routing table 306, the example multicast status monitor 308 and/or, more generally, the example MSP 300 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of MVPN control plane controller 302, the example MVPN data plane controller 304, the example multicast routing table 306, the example multicast status monitor 308 are hereby expressly defined to include a tangible computer readable medium such as a memory, DVD, CD, etc. storing the software and/or firmware. Further still, the example MSP 300 of FIG. 3 may include one or more elements, processes and/or devices in addition to, or instead of, those illustrated in FIG. 3, and/or may include more than one of any or all of the illustrated elements, processes and devices.

Flowcharts representative of example machine readable instructions for implementing the MSP 300 of FIG. 3 are shown in FIGS. 5A, 5B, 6A, and 6B. In these examples, the machine readable instructions comprise program(s) for execution by a processor such as the processor 712 shown in the example processor platform 700 discussed below in connection with FIG. 7. The program may be embodied in software stored on a tangible computer readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program(s) are described with reference to the flowcharts illustrated in FIGS. 5A, 5B, 6A, and 6B, many other methods of implementing the MSP 300 may alternatively be used. For example, the order of execution of the blocks may be changed, and/or some of the blocks described may be changed, eliminated, or combined.

As mentioned above, the example processes of FIGS. 5A, 5B, 6A, and 6B may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5A, 5B, 6A, and 6B may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 5A:
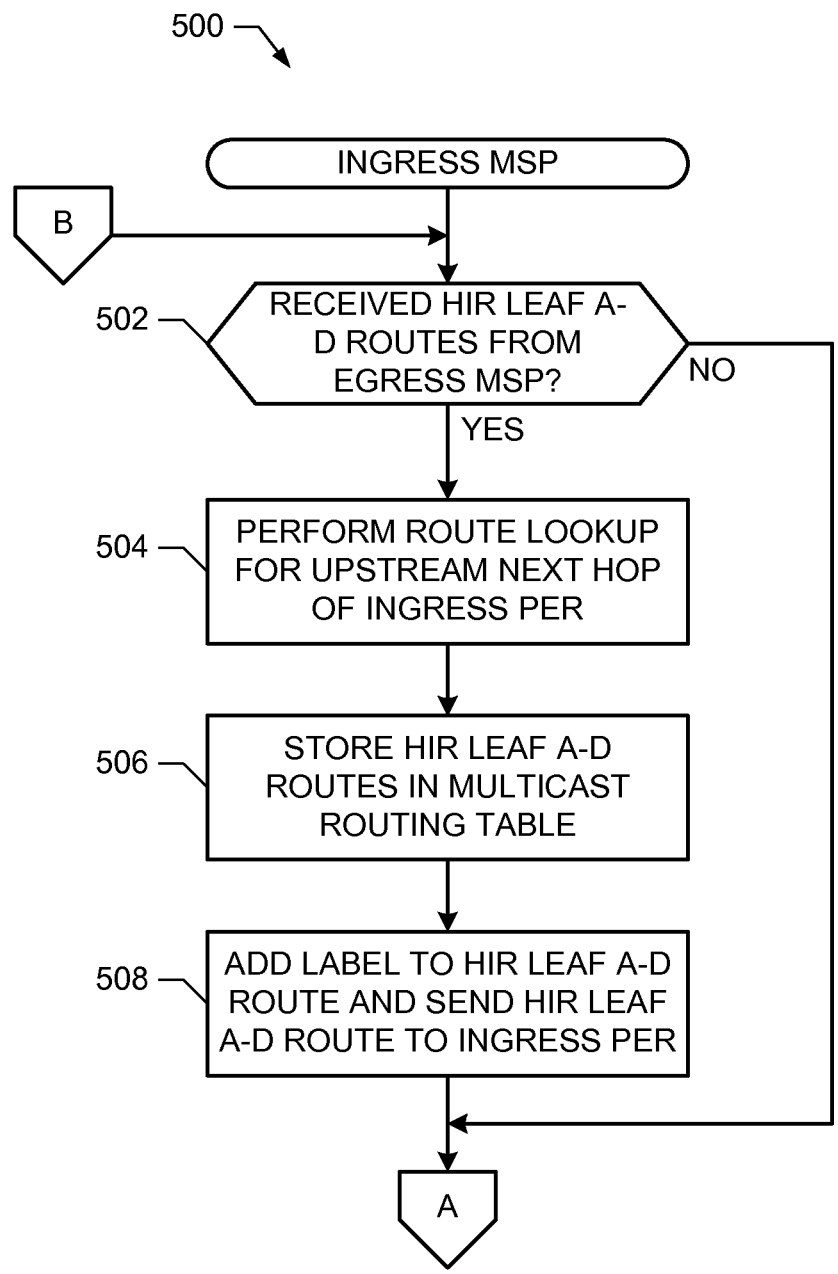
FIGS. 5A-5B are a flowchart representative of example machine readable instructions which may be executed to implement an example ingress multicast service processor.
Figure 5B:
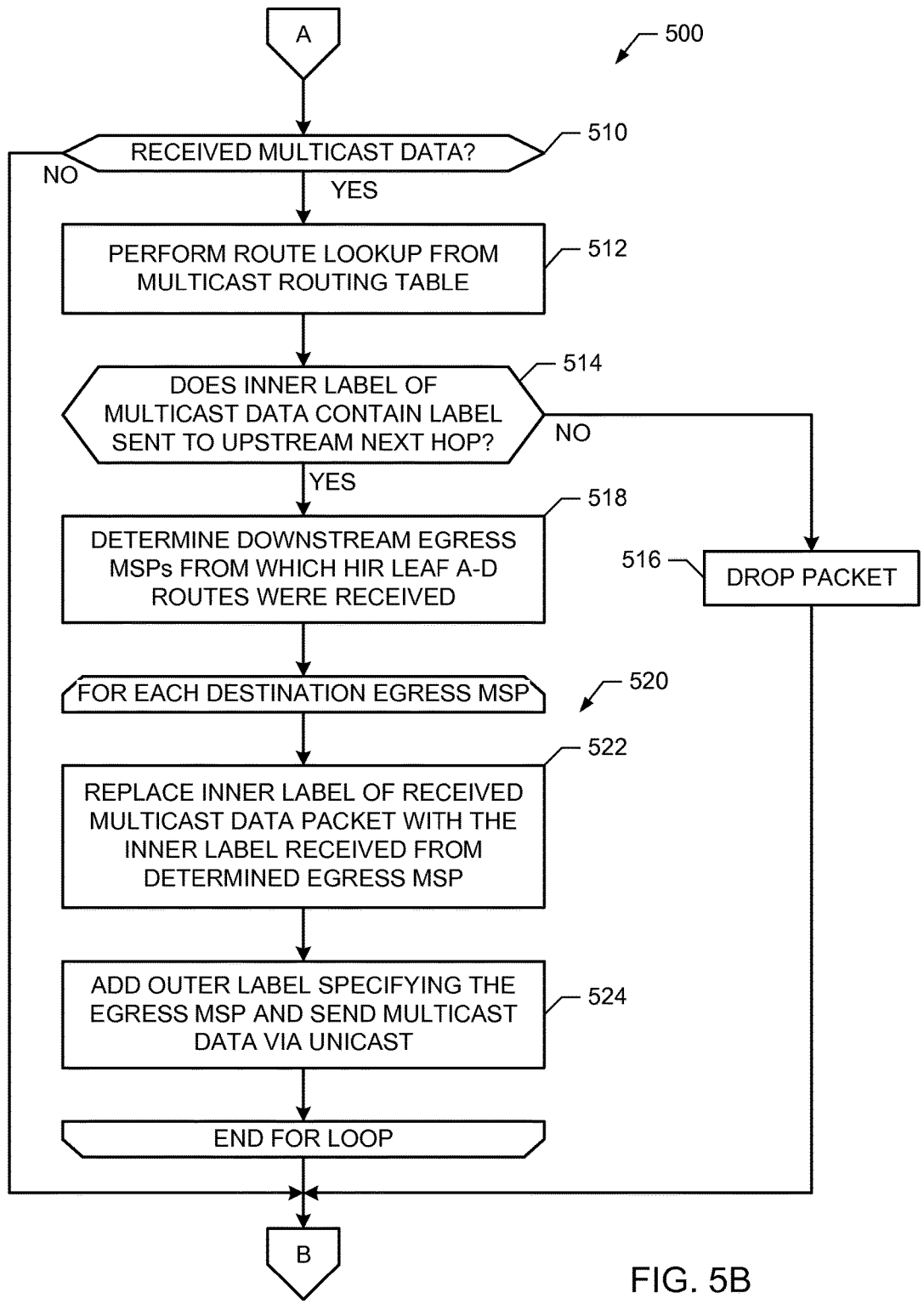
Figure 6A:
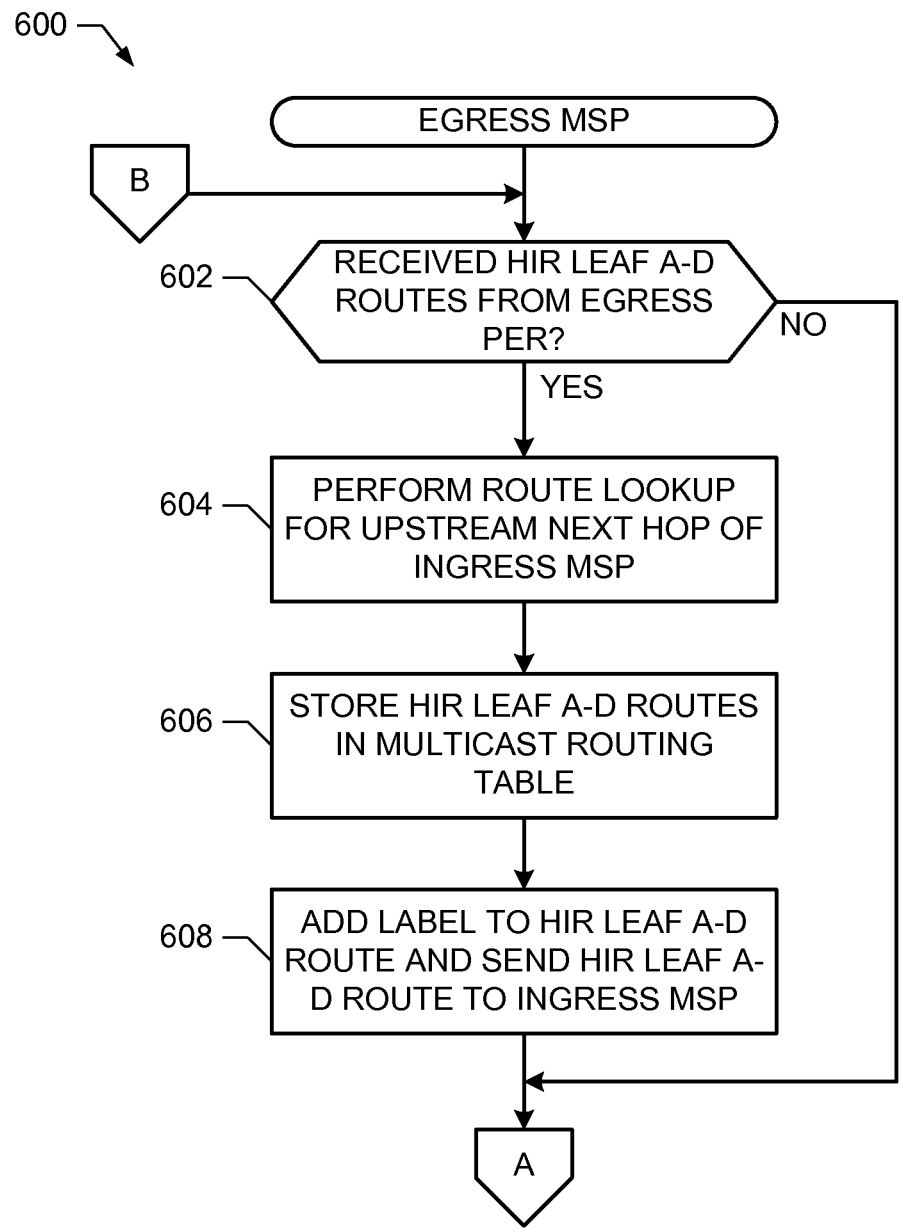
FIGS. 6A-6B are a flowchart representative of example machine readable instructions which may be executed to implement an example egress multicast service processor.
Figure 6B:
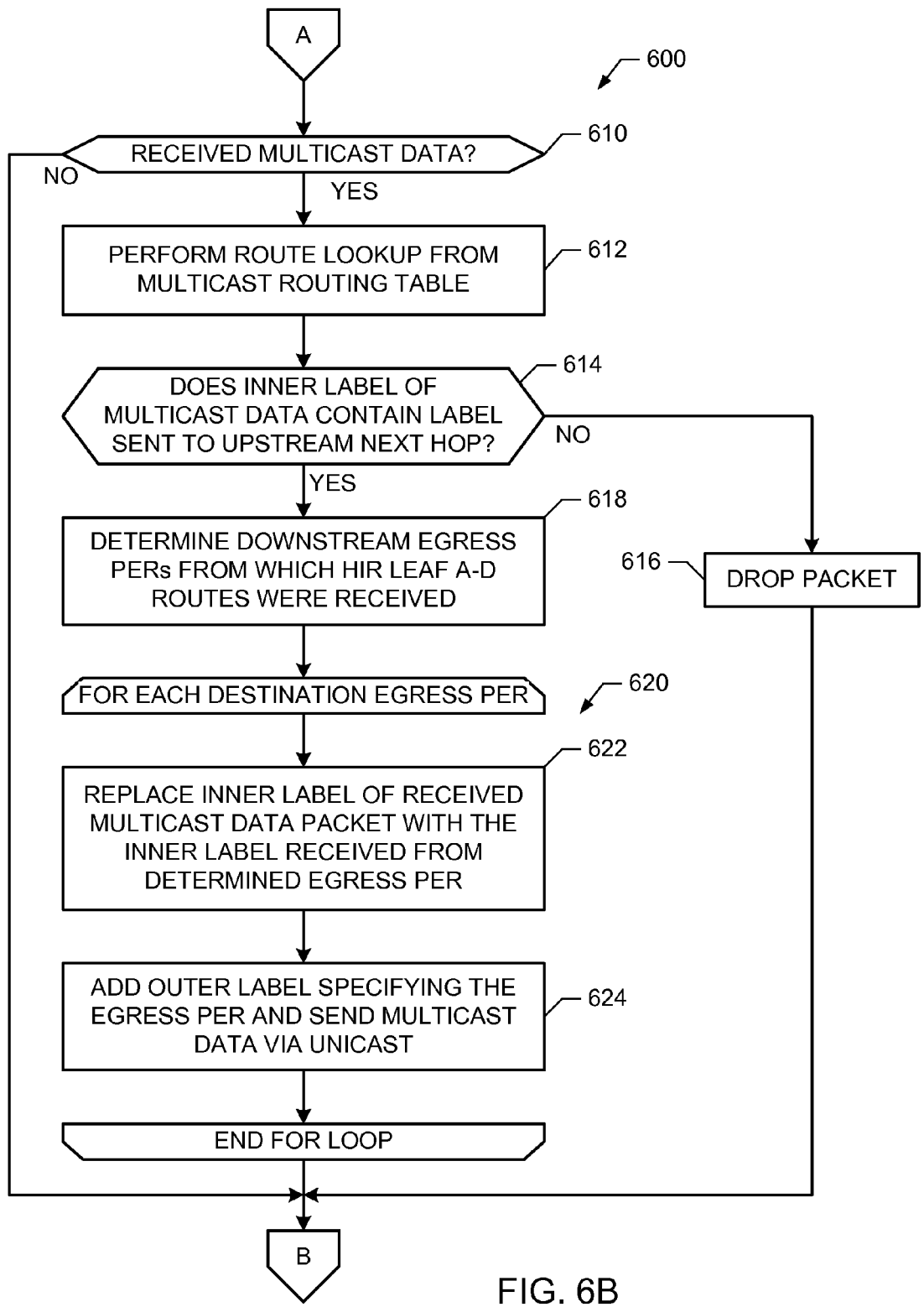

FIGS. 5A-5B are a flowchart representative of example machine readable instructions which may be executed to implement an example ingress MSP. FIGS. 6A-6B are a flowchart representative of example machine readable instructions which may be executed to implement an example egress MSP. The ingress MSP and/or the egress MSP may be implemented by the example MSP 300 of FIG. 3. The example instructions 500 of FIGS. 5A-5B will be described below with reference to the example ingress MSP (e.g., MSP1) of FIGS. 4A-4B and the example MSP 300 of FIG. 3. The example instructions 600 of FIGS. 6A-6B will be described below with reference to the example egress MSP (e.g., MSP4) of FIGS. 4A-4B and the example MSP 300 of FIG. 3. However, because any or all of the MSPs (e.g., MSP1-MSP4) of FIGS. 2, 4A, and 4B may be either or both an ingress MSP and an egress MSP, the example instructions 500, 600 may be implemented in any of the example MSPs. The example instructions 502-508 illustrated in FIG. 5A and the example instructions 602-608 illustrated in FIG. 6A may be considered to occur on the multicast control plane, while the example instructions 510-526 illustrated in FIG. 5B and the example instructions 610-626 illustrated in FIG. 6B may be considered to occur on the multicast data plane.

The example instructions 500 begin in FIG. 5A when an ingress PER determines that a multicast data flow is to be converted to a non-congruent topology. For example, the ingress PER may determine that a non-congruent topology is to be used when a multicast data transmission begins and/or when one or more characteristic (e.g., fan-out, data rate, or both) of the multicast data transmission exceeds a threshold.

An ingress MSP (e.g., MSP1 of FIG. 4A) determines whether a HIR leaf A-D route has been received (block 502). If a HIR leaf A-D route has been received (block 502), the example MSP1 (e.g., via the MVPN control plane controller 302 of FIG. 3) performs a route lookup for an upstream next hop of an ingress PER (block 504). The MVPN control plane controller 302 stores the HIR leaf A-D route in a multicast routing table (e.g., the multicast routing table 306 of FIG. 3) (block 506). An example stored HIR leaf A-D route includes the MVPN customer multicast group (e.g., a source identifier, a group identifier, etc.), an upstream hop (e.g., the ingress PER1 for the MSP1), and a downstream hop (e.g., the router MSP from which the HIR leaf A-D route was received, the MSP3 or MSP4 for MSP1). The MVPN control plane controller 302 adds a label (e.g., a label identifying and/or corresponding to a MVPN multicast route, such as (C-s, C-g), in the MSP1) to the HIR leaf A-D route packet and sends the HIR leaf A-D route packet to the ingress PER1 (block 508).

After sending the leaf route packet (block 508) and/or if a HIR leaf A-D route has not been received (block 502), control moves to FIG. 5B in which the egress MSP (e.g., the MVPN data plane controller 304 of FIG. 3) performs a route lookup from the multicast routing table (e.g., the multicast routing table 306) (block 512). The MVPN data plane controller 304 determines whether to accept the multicast data based on whether the inner label of the multicast data contains a label sent (e.g., by the ingress MSP) to the upstream hop (e.g., the ingress PER) (block 514). If the inner label does not contain such a label (block 514), the example MVPN data plane controller 304 drops the multicast data packet (block 516). If the inner label contains the sent by the ingress MSP to upstream ingress PER (block 514), the ingress MSP determines one or more downstream egress MSPs from which it received HIR leaf A-D routes (block 518). The example received HIR leaf A-D route(s) are generated in block 506 of FIG. 5A.

The example instructions 500 enter a loop 520, which iterates for each destination egress MSP from which the ingress MSP received one or more HIR leaf A-D routes. The example MVPN data plane controller 304 replaces an inner label of the received multicast data packet with an inner label received from the egress MSP (block 522). The example MVPN data plane controller 304 adds an outer label specifying the egress MSP and replicates the multicast data packet to the egress MSP via a unicast path (block 524). After replicating the multicast data packet (block 524), the example loop 520 iterates for the next receiver route.

After the loop 520 ends (e.g., all destination egress MSPs have been processed by the loop 520), or if the multicast data is dropped (block 516), control returns to block 502 of FIG. 5A to determine whether a HIR leaf A-D route has been received.

The example instructions 600 begin in FIG. 6A when an ingress PER determines that a multicast data flow is to be converted to a non-congruent topology. For example, the ingress PER may determine that a non-congruent topology is to be used when a multicast data transmission begins and/or when one or more characteristic (e.g., fan-out, data rate, or both) of the multicast data transmission exceeds a threshold.

An egress MSP (e.g., MSP4 of FIG. 4A) determines whether a HIR leaf A-D route has been received (block 602). If a HIR leaf A-D route has been received (block 602), the example MSP4 (e.g., via the MVPN control plane controller 302 of FIG. 3) performs a route lookup for an upstream next hop of an ingress MSP (block 604). The MVPN control plane controller 302 stores the HIR leaf A-D route in a multicast routing table (e.g., the multicast routing table 306 of FIG. 3) (block 606). An example stored HIR leaf A-D route includes the MVPN customer multicast group (e.g., a source identifier, a group identifier, etc.), an upstream hop (e.g., the ingress MSP1 for the egress MSP4), and a downstream hop (e.g., the routers PER5, PER6 from which the HIR leaf A-D route was received). The MVPN control plane controller 302 adds a label (e.g., a label identifying and/or corresponding to a MVPN multicast route, such as (C-s, C-g), in the MSP1) to the HIR leaf A-D route packet and sends the HIR leaf A-D route packet to the ingress MSP (e.g., MSP1) (block 608).

After sending the leaf route packet (block 608) and/or if a HIR leaf A-D route has not been received (block 602), control moves to FIG. 6B in which the egress MSP (e.g., via the MVPN data plane controller 304 of FIG. 3) performs a route lookup from the multicast routing table (e.g., the multicast routing table 306) (block 612). The MVPN data plane controller 304 determines whether to accept the multicast data based on whether the inner label of the multicast data contains a label sent (e.g., by the egress MSP) to the upstream hop (e.g., the ingress MSP) (block 614). If the inner label does not contain such a label (block 614), the example MVPN data plane controller 304 drops the multicast data packet (block 616). If the inner label contains the sent by the egress MSP to upstream ingress MSP (block 614), the egress MSP determines one or more downstream egress PERs from which it received HIR leaf A-D routes (block 618). The example received HIR leaf A-D route(s) are generated in block 606 of FIG. 6A.

The example instructions 600 enter a loop 620, which iterates for each destination egress PER from which the egress MSP received one or more HIR leaf A-D routes. The example MVPN data plane controller 304 replaces an inner label of the received multicast data packet with an inner label received from the egress PER (block 522). The example MVPN data plane controller 304 adds an outer label specifying the egress PER and replicates the multicast data packet to the egress PER via a unicast path (block 624). After replicating the multicast data packet (block 624), the example loop 520 iterates for the next receiver route.

After the loop 620 ends (e.g., all destination egress PERs have been processed by the loop 520), or if the multicast data is dropped (block 616), control returns to block 502 of FIG. 6A to determine whether a HIR leaf A-D route has been received.

Figure 7:
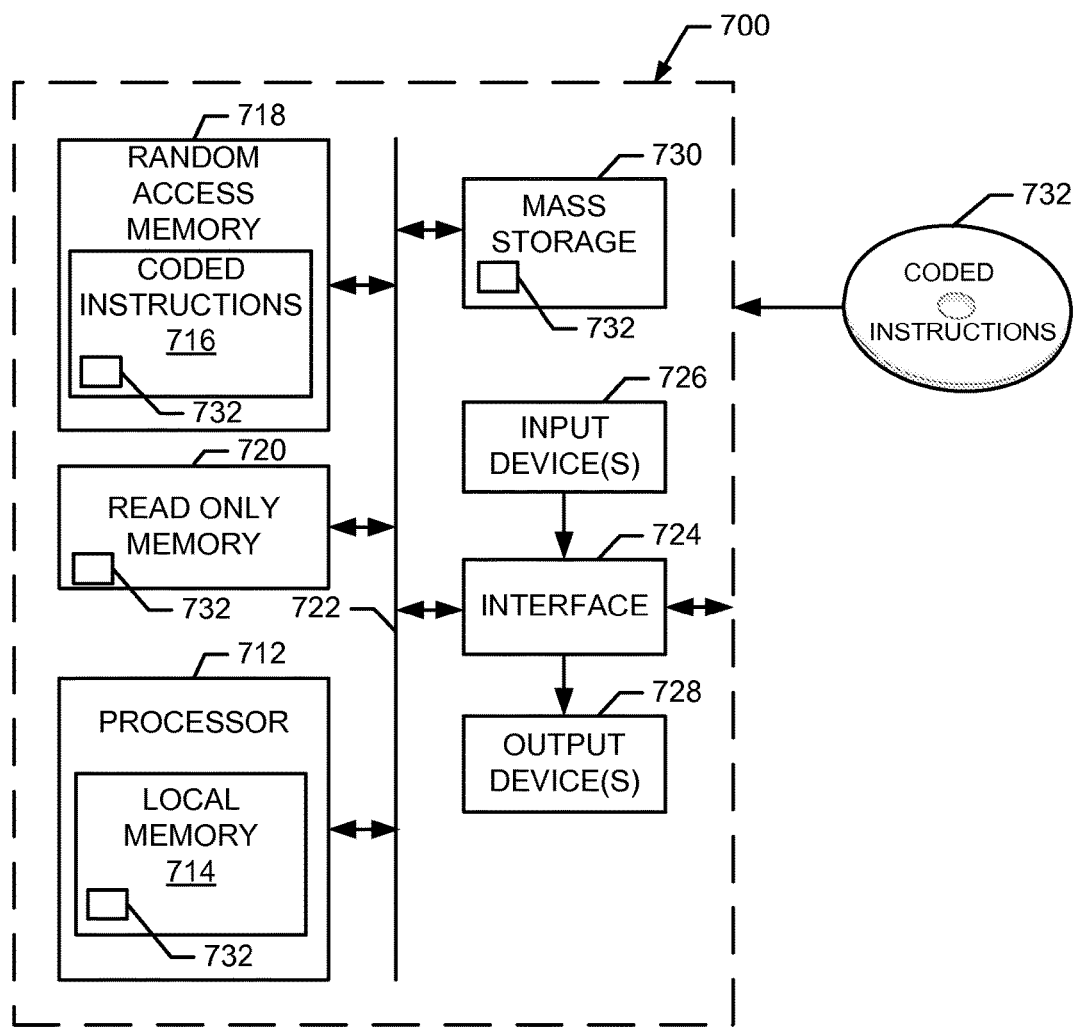
FIG. 7 is a block diagram of an example processing platform that may execute the example machine readable instructions of FIGS. 5A-5B and/or FIGS. 6A-6B to implement the example multicast service processor of FIG. 3, and/or to implement the example area border routers, the example provider edge routers, and/or the example network of FIG. 2.

FIG. 7 is a block diagram of an example processing system 700 capable of implementing the apparatus and methods disclosed herein. The processing system 700 can be, for example, a server, a personal computer, a router, an Internet appliance, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, the machine readable instructions represented in FIGS. 5A-6B. The processor 712 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing machine readable instructions and data. Examples of such mass storage devices 730 include floppy disk drives, hard drive disks, compact disk drives and digital versatile disk (DVD) drives.

The coded instructions 732 of FIGS. 7-11 may be stored in the mass storage device 730, in the volatile memory 718, in the non-volatile memory 720, in the local memory 714 and/or on a removable storage medium, such as a CD or DVD 732.

From the foregoing, it should be apparent that example methods, apparatus, and/or articles of manufacture disclosed herein provide scalable, sustainable and flexible network to provide MVPN services. Example methods, apparatus, and/or articles of manufacture disclosed herein forward multicast packets through a core network in substantially the same way as unicast packets, which reduces and/or eliminates control plane resources used by backbone routers to support MVPN. Instead, existing unicast engineering tools, such as Fast Re-Route or traffic engineering can be applied to the multicast traffic, and the existing unicast network management tools (e.g., Netflow), performance measurements (e.g., World-wide IP Performance Measurement (WIPM)), and troubleshooting procedures are applicable to multicast packets. Example methods, apparatus, and/or articles of manufacture disclosed herein do not implement multicast states in non-scalable core routers that have limited control plane resources, and do not suffer performance penalties due to churn from handling short-lived multicast flows. On the contrary, example methods, apparatus, and/or articles of manufacture disclosed herein allow growth of multicast by, for example, partitioning PERs into different subsets and associating them to different MSPs. Example methods, apparatus, and/or articles of manufacture improve the multicast customer experience to be similar or equal to the unicast customer experience.

Although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to transmit multicast data over a communication network, the method comprising:
   determining, with a processor of a multicast service processor, an upstream hop of a multicast transmission based on a received hierarchical ingress replication route;
   storing, with the processor, a downstream hop and the upstream hop of the multicast transmission in a multicast routing table;

monitoring, with the processor, the multicast transmission, the multicast transmission occurring via an area border router;

in response to detecting at least one of a) a threshold fan-out of the multicast transmission or b) a threshold data rate from a source of the multicast transmission, converting, with the processor, a logical topology of the multicast transmission from a first logical topology to a second logical topology; and in response to receiving a multicast data packet of the multicast transmission, replicating the multicast data packet with the processor based on the downstream hop and the second logical topology.

2. The method as defined in claim 1, wherein the multicast service processor including the processor is physically implemented within a same physical enclosure as the area border router.

3. The method as defined in claim 1, wherein the multicast service processor including the processor is physically implemented as a server that is separate from the area border router.

4. The method as defined in claim 1, wherein replicating the multicast data packet includes transmitting a unicast transmission including the multicast data packet.

5. The method as defined in claim 1, wherein replicating the multicast data packet includes replacing a first inner label of the multicast data packet with a second inner label received from an egress multicast service processor determined based on the downstream hop.

6. The method as defined in claim 1, wherein receiving the multicast data packet includes receiving a unicast transmission including the multicast data packet.

7. The method as defined in claim 1, wherein replicating the multicast data packet includes replacing a first inner label of the multicast data packet with a second inner label received from an egress edge router determined based on the downstream hop.

8. A multicast service processor to transmit multicast data over a communication network, the multicast service processor comprising:

a processor; and a memory storing computer readable instructions which, when executed by the processor, cause the processor to perform operations comprising:

determining an upstream hop of a multicast transmission based on a received hierarchical ingress replication route;

storing a downstream hop and the upstream hop of the multicast transmission in a multicast routing table;

monitoring the multicast transmission, the multicast transmission occurring via an area border router;

in response to detecting at least one of a) a threshold fan-out of the multicast transmission or b) a threshold data rate from a source of the multicast transmission, converting, with the processor, a logical topology of the multicast transmission from a first logical topology to a second logical topology; and in response to receiving a multicast data packet of the multicast transmission, replicating the multicast data packet with the processor based on the downstream hop and the second logical topology.

9. The multicast service processor as defined in claim 8, wherein the multicast service processor is physically implemented within a same physical enclosure as the area border router.

10. The multicast service processor as defined in claim 8, wherein the multicast service processor is physically implemented as a server that is separate from the area border router.

11. The multicast service processor as defined in claim 8, wherein replicating the multicast data packet includes transmitting a unicast transmission including the multicast data packet.

12. The multicast service processor as defined in claim 8, wherein replicating the multicast data packet includes replacing a first inner label of the multicast data packet with a second inner label received from an egress multicast service processor determined based on the downstream hop.

13. The multicast service processor as defined in claim 8, wherein receiving the multicast data packet includes receiving a unicast transmission including the multicast data packet.

14. The multicast service processor as defined in claim 8, wherein replicating the multicast data packet includes replacing a first inner label of the multicast data packet with a second inner label received from an egress edge router determined based on the downstream hop.

15. A tangible computer readable medium comprising computer readable instructions which, when executed, cause a processor of a multicast service processor to perform operations comprising:

determining an upstream hop of a multicast transmission based on a received hierarchical ingress replication route;

storing a downstream hop and the upstream hop of the multicast transmission in a multicast routing table;

monitoring the multicast transmission, the multicast transmission occurring via an area border router;

in response to detecting at least one of a) a threshold fan-out of the multicast transmission or b) a threshold data rate from a source of the multicast transmission, converting, with the processor, a logical topology of the multicast transmission from a first logical topology to a second logical topology; and in response to receiving a multicast data packet of the multicast transmission, replicating the multicast data packet with the processor based on the downstream hop and the second logical topology.

16. The tangible computer readable medium as defined in claim 15, wherein the multicast service processor is physically implemented within a same physical enclosure as the area border router.

17. The tangible computer readable medium as defined in claim 15, wherein the multicast service processor is physically implemented as a server that is separate from the area border router.

18. The tangible computer readable medium as defined in claim 15, wherein replicating the multicast data packet includes transmitting a unicast transmission including the multicast data packet.

19. The tangible computer readable medium as defined in claim 15, wherein replicating the multicast data packet includes replacing a first inner label of the multicast data packet with a second inner label received from at least one of an egress multicast service processor and an egress edge router, determined based on the downstream hop.

20. The tangible computer readable medium as defined in claim 15, wherein receiving the multicast data packet includes receiving a unicast transmission including the multicast data packet.

* * * * *